(12) United States Patent
Nadel

(10) Patent No.: US 7,456,512 B2
(45) Date of Patent: Nov. 25, 2008

(54) PORTABLE SEA-POWERED ELECTROLYSIS GENERATOR

(76) Inventor: Bernard Nadel, P.O. Box 499, Irvington, VA (US) 22480

( * ) Notice: Subject to any disclaimer, the term of this patent is extended or adjusted under 35 U.S.C. 154(b) by 0 days.

(21) Appl. No.: 11/690,630

(22) Filed: Mar. 23, 2007

(65) Prior Publication Data

US 2008/0231055 A1 Sep. 25, 2008

(51) Int. Cl.
*F03B 13/10* (2006.01)
*F03B 13/12* (2006.01)
*H02P 9/04* (2006.01)
*F03B 13/18* (2006.01)

(52) U.S. Cl. .......................... 290/53; 60/498

(58) Field of Classification Search ............. 290/53; 60/498
See application file for complete search history.

(56) References Cited

U.S. PATENT DOCUMENTS

| | | | | | |
|---|---|---|---|---|---|
| 163,451 | A | | 5/1875 | Buckner | 60/502 |
| 562,317 | A | * | 6/1896 | Martin | 417/331 |
| 738,996 | A | * | 9/1903 | Hagen | 417/332 |
| 1,057,287 | A | * | 3/1913 | Shipman | 60/498 |
| 1,458,049 | A | * | 6/1923 | Grieshaber | 472/119 |
| 1,461,747 | A | * | 7/1923 | Boone | 60/504 |
| 1,953,285 | A | * | 4/1934 | Arner | 60/498 |
| 2,179,537 | A | | 11/1939 | Zoppa | 290/42 |
| 2,749,085 | A | * | 6/1956 | Searcy | 60/505 |
| 3,777,494 | A | * | 12/1973 | Soderlund | 60/507 |
| 3,892,653 | A | * | 7/1975 | Pacheco | 204/238 |
| 3,959,663 | A | | 5/1976 | Rusby | 290/53 |
| 3,965,365 | A | * | 6/1976 | Parr | 290/53 |
| 3,975,913 | A | * | 8/1976 | Erickson | 60/645 |
| 4,073,142 | A | * | 2/1978 | Tornabene | 60/502 |
| 4,078,985 | A | * | 3/1978 | Takeuchi | 204/228.5 |
| 4,092,828 | A | * | 6/1978 | Garza | 60/506 |
| 4,108,579 | A | * | 8/1978 | Martinez et al. | 417/333 |
| 4,228,360 | A | * | 10/1980 | Navarro | 290/43 |
| 4,249,639 | A | * | 2/1981 | Vukovic | 185/30 |
| 4,260,901 | A | * | 4/1981 | Woodbridge | 290/42 |
| 4,352,023 | A | * | 9/1982 | Sachs et al. | 290/42 |
| 4,379,235 | A | * | 4/1983 | Trepl, II | 290/53 |
| 4,384,212 | A | * | 5/1983 | Lapeyre | 290/53 |
| 4,418,286 | A | * | 11/1983 | Scott | 290/42 |
| 4,469,955 | A | * | 9/1984 | Trepl, II | 290/53 |
| 4,598,547 | A | * | 7/1986 | Danihel | 60/507 |
| 4,672,222 | A | * | 6/1987 | Ames | 290/53 |
| 4,783,860 | A | * | 11/1988 | Funke et al. | 4/491 |
| 4,785,678 | A | * | 11/1988 | McGugan et al. | 74/42 |
| 4,792,290 | A | * | 12/1988 | Berg | 417/332 |
| 5,048,356 | A | * | 9/1991 | Levko | 74/60 |
| 5,089,107 | A | * | 2/1992 | Pacheco | 204/230.2 |
| 5,328,443 | A | * | 7/1994 | Lee | 601/92 |
| 5,372,617 | A | * | 12/1994 | Kerrebrock et al. | 48/61 |
| 5,411,377 | A | * | 5/1995 | Houser et al. | 417/333 |
| 5,808,368 | A | * | 9/1998 | Brown | 290/53 |

(Continued)

*Primary Examiner*—Nicholas Ponomarenko
*Assistant Examiner*—Pedro J Cuevas
(74) *Attorney, Agent, or Firm*—Michael L. Greenberg, Esq.; Greenberg & Lieberman, LLC

(57) ABSTRACT

This portable sea-powered electrolysis generator is an apparatus that continually and conveniently harnesses the energy emanating from sea-wave motion in order to propagate hydrogen to be stored for use as a clean, practical and reusable energy source through the process of electrolysis. The motion of waves is used to power a generator that supplies power to water to, through electrolysis, produce hydrogen.

2 Claims, 3 Drawing Sheets

U.S. PATENT DOCUMENTS

| | | | |
|---|---|---|---|
| 5,929,531 A * | 7/1999 | Lagno | 290/53 |
| 6,029,294 A * | 2/2000 | Saringer | 5/600 |
| 6,059,667 A * | 5/2000 | Pinch | 472/119 |
| 6,269,500 B1 * | 8/2001 | Saringer | 5/600 |
| 6,644,027 B1 * | 11/2003 | Kelly | 60/498 |
| 6,731,018 B1 * | 5/2004 | Grinsted et al. | 290/42 |
| 6,759,757 B1 | 7/2004 | Campbell | 290/54 |
| 6,766,643 B2 * | 7/2004 | Christensen | 60/398 |
| 6,814,633 B1 * | 11/2004 | Huang | 440/9 |
| 6,825,574 B1 * | 11/2004 | Mooring | 290/1 R |
| 6,833,631 B2 * | 12/2004 | Van Breems | 290/42 |
| 6,849,963 B2 * | 2/2005 | Grinsted et al. | 290/42 |
| 6,967,413 B2 | 11/2005 | Atiya | 290/43 |
| 7,023,104 B2 * | 4/2006 | Kobashikawa et al. | 290/42 |
| 7,220,290 B2 * | 5/2007 | Amendola et al. | 48/61 |
| 7,228,812 B2 * | 6/2007 | Morse | 114/382 |
| 2002/0145288 A1 * | 10/2002 | Van Breems | 290/42 |
| 2002/0155330 A1 * | 10/2002 | Tanaka | 429/19 |
| 2003/0145587 A1 * | 8/2003 | Christensen | 60/398 |
| 2003/0227173 A1 * | 12/2003 | Gorshkov | 290/53 |
| 2004/0007881 A1 * | 1/2004 | Kobashikawa et al. | 290/53 |
| 2004/0009392 A1 * | 1/2004 | Petillo et al. | 429/122 |
| 2004/0031265 A1 * | 2/2004 | Doleh et al. | 60/398 |
| 2004/0033194 A1 * | 2/2004 | Amendola et al. | 423/658.2 |
| 2005/0016840 A1 * | 1/2005 | Petillo | 204/248 |
| 2005/0285402 A1 * | 12/2005 | Ames | 290/42 |
| 2006/0162642 A1 * | 7/2006 | Morse | 114/382 |
| 2006/0202483 A1 * | 9/2006 | Gonzalez | 290/53 |
| 2006/0233613 A1 * | 10/2006 | Welch et al. | 405/76 |
| 2006/0242954 A1 * | 11/2006 | Welch, Jr. | 60/398 |
| 2006/0249393 A1 * | 11/2006 | Ghosh et al. | 205/639 |
| 2006/0273594 A1 * | 12/2006 | Gehring | 290/42 |
| 2007/0130929 A1 * | 6/2007 | Khan et al. | 60/398 |
| 2007/0138021 A1 * | 6/2007 | Nicholson | 205/628 |
| 2007/0164568 A1 * | 7/2007 | Greenspan et al. | 290/53 |
| 2007/0217994 A1 * | 9/2007 | Amendola et al. | 423/648.1 |
| 2007/0228736 A1 * | 10/2007 | Smushkovich | 290/42 |
| 2007/0271844 A1 * | 11/2007 | Mohring et al. | 48/61 |

* cited by examiner

PORTABLE SEA-POWERED ELECTROLYSIS GENERATOR

FIELD OF THE INVENTION

The present invention relates primarily to a balance bar, bearings, weights and a series of moving parts such as chain arms, gears and levers combined with two wires, an anode and a cathode, that use the motion of seawater to ultimately employ the process of electrolysis in order to propagate and store hydrogen.

BACKGROUND OF THE INVENTION

There is no question that energy and energy consumption has been a fundamental part of society for more than a century. Furthermore, fueling our ever-growing appetite for electricity from the industrial level down to personal usage is an ongoing concern for most Americans. Electricity is costly. Issues with natural resources such as oil and its gasoline byproduct are well documented. Oil reserves are being depleted as part of an industry that is so weighted on our society that it is even considered by many to be a national security issue. Costs are always in flux as gasoline shortages are never out of the realm of possibility. In the case of even the handiest of personal generators, the individual's use and need for electricity will go only as far as his or her supply of gasoline, which again, is a resource that is out of the control of nearly all persons. And the harnessing of many of these sources of energy often results in costly or environmentally dangerous byproducts as well. As a result, alternative forms of energy to fuel such items as vehicles has been emphasized from the presidential level on down. Hydrogen fuel cells are one major example of a viable alternative to typical gasoline-powered vehicles although the harnessing and propagation of this clean source of energy is underdeveloped. This form of energy is exciting to many people because unlike usual emissions from gasoline-powered vehicles, those that operate with hydrogen fuel cells simply emit water.

Moreover, this issue is especially relevant for those involved in maritime work. For example, if a fisherman or other boater runs out of gas or springs a leak far from shore, he or she is dependent on other factors such as radio and is therefore limited in his own survival techniques. The same goes for an offshore facility that may not be able to resupply its power supply due to various potential circumstances. And these reasons barely reiterate the issues of fuel supply and costs. Boats and ships often need to refuel which of course takes time and money, a factor that can have reciprocal effects on the marketplace. The same can go for coastal operations.

Nuclear power also has its critics in regards to waste, perceived danger, regulation and other issues. In addition, this form of propagating electricity is useful on power grids or large Navy ships and submarines, but not so much away from this network, which again, places the user at the whim of the power company and government for their electrical needs. This desire for cleaner and abundant sources for electrical power has prompted some forward thinkers to come up with various methods to employ natural power to convert into electricity. Some use solar panels which stores and converts energy from the sun. Others attempt to harness the power of the wind. It should be noted that this clean and noble effort often faces conflict from those that believe the giant modern windmills are either not cost effective, an eyesore or both. These natural methods continue to be impractical in many cases, especially applied to vehicles. In the case of vehicles, gasoline has had a long and sordid history with gasoline dependence and propagation. A fuel source that is generated cleanly and efficiently from an unlimited source would have an amazing impact.

There is a need for a clean, renewable apparatus for continuously taking a natural source in order to propagate hydrogen in a manner that is not only efficient and cost-effective, but also portable enough to make it practical for entities ranging from individuals to corporate enterprises operating on the sea. A generator that utilizes the motion of sea waves to ultimately propagate and store the hydrogen contained in the water to be used as useful energy in such items as vehicle fuel cells can solve many energy problems that face not only coastal and maritime individuals and businesses, but many other enterprises as well. The fact that the portable sea-powered electrolysis generator apparatus engages a process that is clean and harnesses the power of sea waves, an occurrence that encompasses more than two-thirds of the Earth's surface, is an important and useful achievement. As described below, nothing else compares with the unique aspects of the present invention.

U.S. Pat. No. 163,451 issued to Buckner on May 18, 1875 is a device that, attached to a water-side pier, produces electricity by converting the rocking motion of waves into electricity. Unlike the present invention, this device is limited in capability to the shore and is not meant to handle the relatively larger waves found farther out to sea.

U.S. Pat. No. 2,179,537 issued to Zoppa on Nov. 14, 1939 is a device that gathers the up-and-down wave movement with weights and an arm-like apparatus to harness energy. Unlike the present invention, this device is limited in its efficiency and scope because it is only capable of operating intermittently from the up-and-down motion to the extent of 50 percent instead of continuously.

U.S. Pat. No. 6,967,413 issued to Atiya on Nov. 22, 2005 is a device that extracts energy from ocean tides and offshore wind. Unlike the present invention, this device is a very large and stationary facility that is restricted to only one location and its location requires a large-scale construction endeavor and is not meant to be portable or accessible for smaller enterprises.

U.S. Pat. No. 6,759,757 issued to Campbell on Jul. 6, 2004 is a device that employs a paddle wheel to create hydrogen for hydrogen fuel cells. Unlike the present invention, this device is limited to harnessing energy from the larger ocean tides and cannot detect and maximize the results of the motion from smaller types of waves.

U.S. Pat. No. 3,959,663 issued to Rusby on May 25, 1976 is a device that converts the energy from the rising tides into electricity. Unlike the present invention, this device is limited to areas and times where high tide conditions exist and is not conducive to unique continuing, adaptability or location needs.

A need has been established for a portable generator that uses the rocking motion of sea waves to harness its full energy potential to ultimately employ a process for the storage of the hydrogen contained in the water for use in such items as vehicle fuel cells. It is not enough to have a bulky, immobile generator that is far from full efficiency. Those operating at or near the sea need a clean, renewable power generator that can be taken with them at all times and not constrained by tidal issues. In addition, they need a level of power efficiency that is practical and can adapt to the myriad operations and individual needs that occur on or near the sea. The present invention is portable enough to operate anywhere from near the shore to out in the middle of the ocean at a practical and high level of efficiency. Therefore, the present invention satisfies the needs of those who require an alternative to conventional oil-based power by using the same elements of many of their livelihoods—the sea—to propagate a clean, affordable, efficient and practical energy source in the form of hydrogen to suit their unique needs at the location and times of this need irrespective of tide or any other conditions. The electrolysis method also is preferred because unlike other forms of energy, the byproduct of the present invention is oxygen as opposed to a toxin or other costly environmental element. This need also includes the notion that a wave-powered apparatus should operate in a position above the salt water in order to avoid barnacles and other adverse effects from the brine. The present invention satisfies that need as well.

SUMMARY OF THE INVENTION

When the present invention is activated by the natural occurrence of sea waves, the arms of a balance bar that is angled to operate in conjunction with a moving fulcrum creates a see-saw motion. The force of this motion is accented and strengthened by weights hung near the balancing bar. A series of chain arms, levers and one-way gears helps create a more rotary and accelerated motion. One-way bearings are included with the gears to ensure that virtually no motion is lost in order to maintain the full energy potential of the present invention. The tendency for objects such as weights at rest to remain in that state results in the admission of torque to the heavy bull gear. This item is equipped with a departure bearing similar to the gears found in a rear bicycle wheel. The element is free-wheeling which has the effect of maintaining a steady rotation that runs the generator. This, in turn, produces DC current. At the same time, two wires, an anode and a cathode from the generator are immersed into a tank containing brine from the sea. From this element, the DC current is used by electrolysis to break down an endless supply of salt water into its component parts, which is hydrogen and oxygen. The gas is then accumulated and pumped to a storage facility by a pump that also is operated by the motion of the sea waves. The cathode is necessary to produce the hydrogen while the anode renders the byproduct, which is oxygen.

For purposes of brevity and clarity, like components and elements of the apparatus of the present invention will bear the same designations or numbering throughout the FIGURES.

DESCRIPTION OF THE PREFERRED EMBODIMENT

I. The Parts

Figure 1:
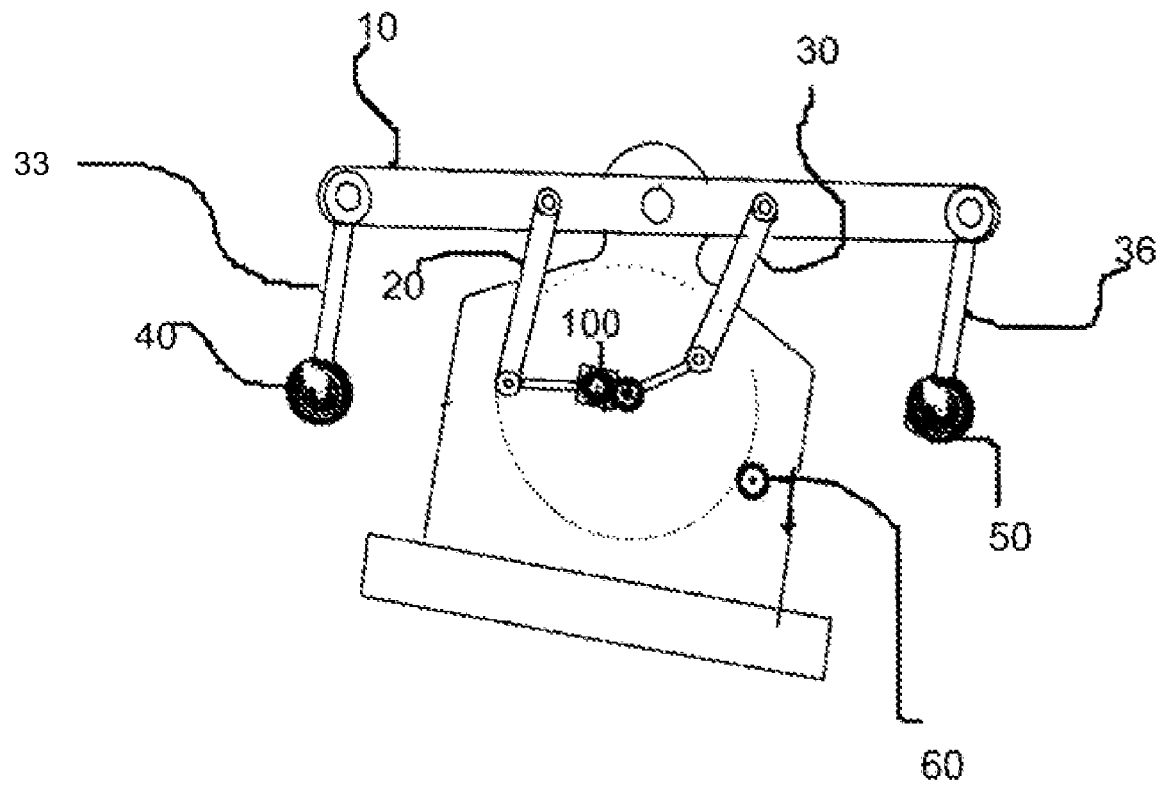
FIG. 1 is a front view of the present invention.

In FIG. 1, we see the generator portion of the present invention in an angular stance with the weights basically unmoved and the balance bar (10) parallel with the departure gears (100). Interior chain arms (20, 30) and exterior chain arms (33, 36) are included, as are the balancing weights (40, 50), as they compliment the generator gear (60).

Figure 2:
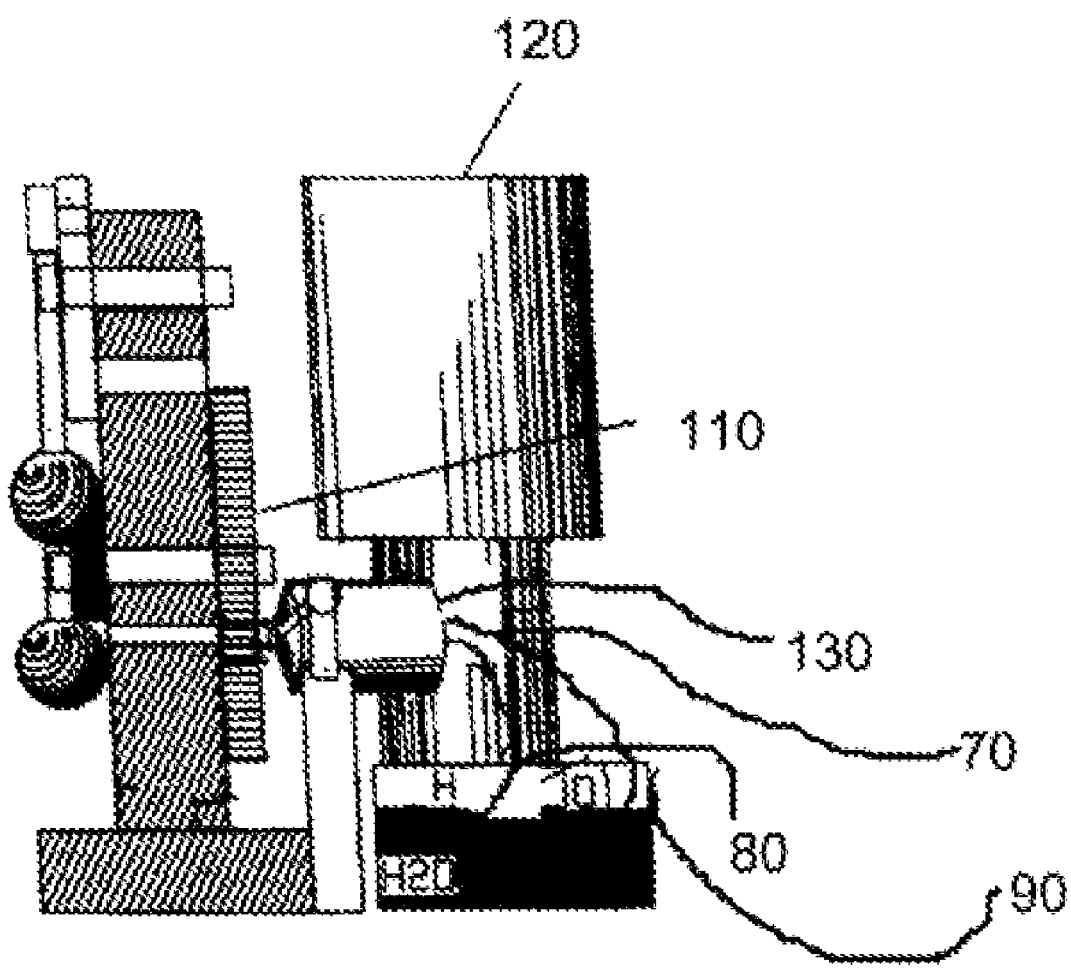
FIG. 2 is a side view and cross section of the present invention showing position of the gas accumulator (120), bull gear (110), generator (130) and salt water basin (90), as well as the anode (70) and cathode (80) wires.

In FIG. 2, we see the various elements of the present invention from a different angle, including necessary components such as the anode (70), cathode (80), and the salt water basin (90) that are instrumental during the energy conversion process.

Figure 3:
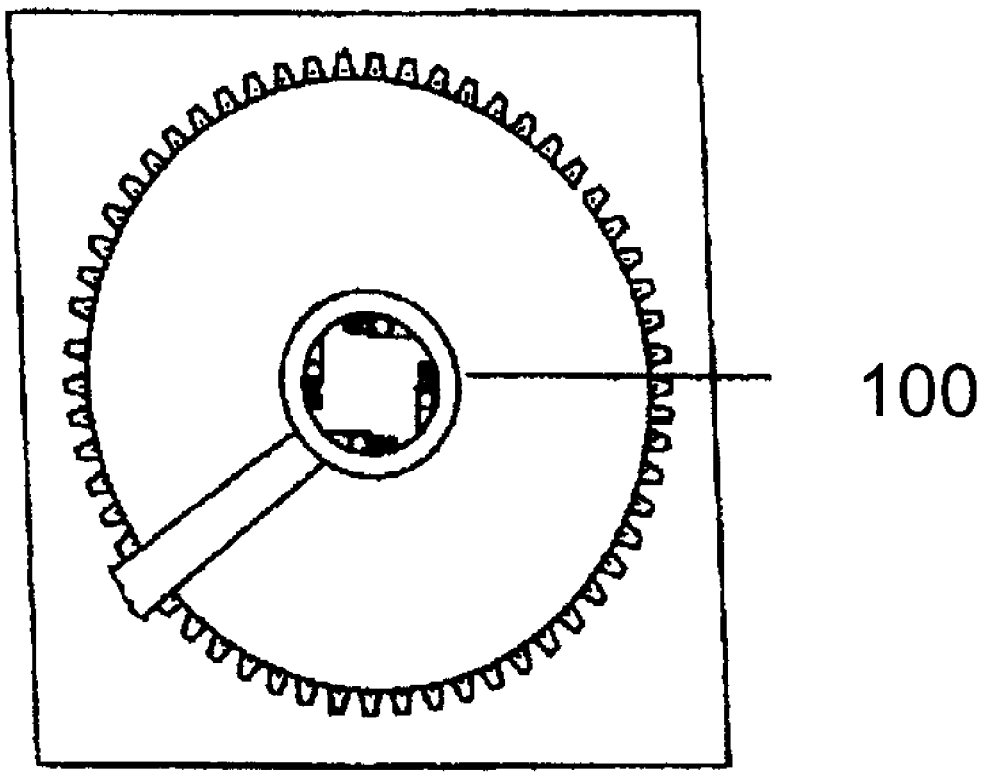
FIG. 3 is a close-up view of the departure gears (100) for the present invention.

In FIG. 3, we see the close-up view of a departure gear (100).

II. The Usage

The moving and non-moving parts of the present invention operate to translate the random, rocking motion of the sea into uninterrupted rotary motion, with the end result being the propagation of hydrogen for future use. The conversion into electricity uses a process called electrolysis, which essentially takes the hydrogen and oxygen found in sea water and converts them into gas, where it is pumped to a storage facility, and ultimately becomes clean, useful and practical source of energy for such items as vehicle fuel cells.

Since the present invention is completely portable, it can be moved to any seawater area that the user feels necessary. To make use of the present invention, the apparatus is attached to a floating object and then anchored at a location with optimal wave action. And if the circumstances change, the apparatus can simply be transported to another location that better suits the user's needs. In addition, a boater can utilize a smaller size of the present invention in order to use it as a trickle charger. In this instance, the present invention would operate the same as far as efficiency and effectiveness in proportion to its size.

The present invention actually works by sensing every motion of seawater—whether it is up, down, subtle, aggressive—through a method involving a balance bar (10) that remains at rest while a rocking fulcrum post (98) interprets all of the water's activity and ultimately converts it into a smooth and continuous rotary motion. In order to maximize the efficiency of the present invention to not only provide continuous effect, but also the most energy available, balance weights (40, 50) act to strengthen and intensify the motion of the bar. The chain arms (20, 30) and levers also help make the motion rotary and accelerated to provide even more efficiency. Meanwhile, the departure gears (100) as demonstrated in FIG. 1 and FIG. 3 provide a method to retain nearly all the motion in a further process toward maximization of the present invention's full energy input. The departure gears (100) conventionally turn the bull gear (110), and then the bull gear (110), because of its relative heaviness and size, turns the generator (130) in a conventional manner.

As the process proceeds, torque to the heavy bull gear (110) is built up through the help of the maintaining of weights at relative rest. The departure gears (100) then operates a steady and continuous rotation of motion that runs a generator (130) and in turn produces the electrical current. As all this is going on, the seawater is moved through the tank (90) where the anode (70) and cathode (80) are immersed. The sea water initially enters into the present invention via a pump that conventionally pumps water into the tank (90) where the anode (70) and cathode (80) are immersed. This is the point where the electrolysis process occurs as the gas is accumulated in the gas accumulator (120) and pumped away for storage to be used later in a vehicle fuel cell or other hydrogen-based application. The anode (70) serves to render the oxygen byproduct while the cathode (80) produces the hydrogen.

Primarily, the present invention is a necessary and useful apparatus that harnesses the clean and natural power of seawater in a portable and wholly practical manner to ultimately propagate hydrogen through the process of electrolysis. The benefits to businesses and individuals who operate on or near the sea include economic, social and practical applications, as well as for other applications revolving around hydrogen vehicle fuel cells and other items. The present invention makes use of a permanent natural element in seawater to produce a situation where people can act much more self-sufficiently in an environment of cost-effectiveness and geological friendliness. By harnessing the power of the waves, the present invention effectively provides a continuous stream of hydrogen for storage for those operating on or near the sea. The portability of the present invention also provides a significant amount of adaptability on the part of those that use the apparatus, as does its physical makeup to protect against such adverse elements as brine and barnacles. It is to be understood that the present invention is not limited to the sole embodiment described above, but encompasses any and all embodiments within the scope of the claims.

The invention claimed is:

1. A portable sea-powered electrolysis generator, comprising:
   at least four arms, said at least four arms being at least two exterior chain arms and at least two interior chain arms;
   a balance bar disposed above said at least four arms, said at least four arms hanging from said balance bar;
   a gear means physically connected to said at least two interior chain arms, said gear means configured to rotate as said at least two interior chain arms move up and down;
   a generator physically connected to said gear means, said generator configured to produce electrical current as said generator is turned by said gear means;
   an anode configured to transfer electricity with said generator;
   a cathode configured to transfer electricity with said generator;
   water, said anode and said cathode physically in said water;
   a tank, configured to contain said water, said water held within said tank;
   a pump, physically connected to said tank, said pump configured to pump said water into said tank; and
   an accumulator, physically connected to said tank, said accumulator configured to pump gas from said tank.

2. The portable sea-powered electrolysis generator of claim 1, further comprising balancing weights physically connected to said exterior chain arms.

* * * * *